(12) United States Patent
Karlen et al.

(10) Patent No.: US 12,109,644 B2
(45) Date of Patent: Oct. 8, 2024

(54) METHOD OF MANUFACTURING METAL ARTICLES

(71) Applicant: Hamilton Sundstrand Corporation, Charlotte, NC (US)

(72) Inventors: Eric Karlen, Rockford, IL (US); William Louis Wentland, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 540 days.

(21) Appl. No.: 17/395,714

(22) Filed: Aug. 6, 2021

(65) Prior Publication Data

US 2021/0362267 A1 Nov. 25, 2021

Related U.S. Application Data

(62) Division of application No. 15/217,340, filed on Jul. 22, 2016, now Pat. No. 11,130,191.

(51) Int. Cl.
| | |
|---|---|
| *B22F 9/04* | (2006.01) |
| *B22F 1/17* | (2022.01) |
| *B23K 15/00* | (2006.01) |
| *B23K 26/00* | (2014.01) |
| *B23K 26/342* | (2014.01) |
| *B33Y 10/00* | (2015.01) |
| *B33Y 70/10* | (2020.01) |
| *B22F 10/28* | (2021.01) |

(Continued)

(52) U.S. Cl.
CPC ............ *B23K 15/0093* (2013.01); *B22F 1/17* (2022.01); *B22F 9/04* (2013.01); *B23K 15/0086* (2013.01); *B23K 26/0006* (2013.01); *B23K 26/342* (2015.10); *B33Y 10/00* (2014.12); *B33Y 70/10* (2020.01); *B22F 10/28* (2021.01); *B23K 2103/10* (2018.08); *B23K 2103/166* (2018.08); *Y02P 10/25* (2015.11)

(58) Field of Classification Search
None
See application file for complete search history.

(56) References Cited

U.S. PATENT DOCUMENTS

| | | | |
|---|---|---|---|
| 5,469,821 | A | 11/1995 | Gosch |
| 5,570,502 | A | 11/1996 | Sawtell et al. |

(Continued)

FOREIGN PATENT DOCUMENTS

| | | |
|---|---|---|
| CN | 105036801 A | 11/2015 |
| JP | 2006040992 A | 2/2006 |

(Continued)

*Primary Examiner* — George Wyszomierski
(74) *Attorney, Agent, or Firm* — CANTOR COLBURN LLP

(57) ABSTRACT

A method for making an article is disclosed. According to the method, a digital model of the article is generated. The digital model is inputted into an additive manufacturing apparatus comprising an energy source. The additive manufacturing apparatus applies energy from the energy source to successively applied incremental quantities of a powder to fuse the powder to form the article corresponding to the digital model. The powder particles individually include a composite core including a first phase of a first metal and a second phase of a ceramic. A first shell including a second metal is disposed over the core.

17 Claims, 2 Drawing Sheets

(51) Int. Cl.
  *B23K 103/10* (2006.01)
  *B23K 103/16* (2006.01)

(56) References Cited

U.S. PATENT DOCUMENTS

| | | | |
|---|---|---|---|
| 6,764,773 | B2 | 7/2004 | Omachi et al. |
| 7,357,994 | B2 | 4/2008 | Hazel et al. |
| 7,658,781 | B1 | 2/2010 | Waggoner et al. |
| 7,718,280 | B2 | 5/2010 | Wilson |
| 2009/0202814 | A1 | 8/2009 | Jabado et al. |
| 2012/0168802 | A1* | 7/2012 | Hirotsuru ............ C04B 41/52 428/68 |
| 2013/0307201 | A1 | 11/2013 | Mcenerney |
| 2014/0287149 | A1 | 9/2014 | Zimmermann et al. |
| 2016/0175929 | A1 | 6/2016 | Colin et al. |
| 2016/0318257 | A1 | 11/2016 | Brooks et al. |
| 2017/0044069 | A1* | 2/2017 | Harris ................ C04B 35/64 |

FOREIGN PATENT DOCUMENTS

| | | |
|---|---|---|
| JP | 2013199689 A | 10/2013 |
| JP | 2015071825 A | 4/2015 |
| KR | 519063 B1 | 10/2005 |
| WO | 2015001241 A2 | 1/2015 |
| WO | 2015092442 A1 | 6/2015 |

\* cited by examiner

METHOD OF MANUFACTURING METAL ARTICLES

CROSS-REFERENCE TO RELATED APPLICATIONS

This application is a Division of U.S. application Ser. No. 15/217,340, filed Jul. 22, 2016, now U.S. Pat. No. 11,130,191, the disclosure of which is incorporated herein by reference in its entirety.

BACKGROUND

This disclosure relates to additive manufacturing of metal articles.

Additive manufacturing technologies have been used and proposed for use for fabricating various types of articles from various types of materials. Broadly viewed, additive manufacturing can include any manufacturing process that incrementally adds material to an assembly during fabrication, and has been around in one form or another for many years. Modern additive manufacturing techniques, however, have been blended with three-dimensional computer imaging and modeling in various types to produce shapes and physical features on articles that are not readily produced with conventional molding, shaping, or machining techniques. Such techniques were initially developed using polymer compositions that are fusible or polymerizable in response to a controllable source of light or radiation such as a laser. Three-dimensional articles can be fabricated a layer at a time based on data from a corresponding layer of a three-dimensional computer model, which is generally known as stereolithography. With these techniques, a polymer powder or polymerizable liquid polymer composition is exposed to a source of energy such as a laser to fuse a thermoplastic polymer powder by heating it to a fluid state or by initiating a reaction between components in a powder or polymerizable liquid composition. The powder or liquid can be applied a layer at a time by any known mechanism such as by spray or other application, but is often maintained in a bed where the article being fabricated is formed. After each layer is fused and solidified, the article is lowered in the bed or the level of the bed is raised so that a layer of powder or liquid covers the previously-formed layer of the article, and another layer of the powder or liquid is fused and solidified by selective exposure to the energy source based on data from another corresponding layer of the computer model.

Additive manufacturing techniques have also been used for the fabrication of metal articles. Metal thermal spray and other additive manufacturing techniques for metals have of course been known for some time. The application of stereolithographic manufacturing techniques to metals has led to significant advancements in the fabrication of three-dimensional metal articles. Using such techniques, a metal article being manufactured is maintained in a bed of metal powder, with the surface of the article below the surface of the powder in the bed so that there is a layer of metal powder over the surface of the article. Metal powder in this layer is selectively fused such as by selective exposure to an energy source such as a laser or electron beam, according to data from a corresponding layer of a three-dimensional computer model of the article. After each layer is fused and solidified, the article is lowered in the bed or the level of the bed is raised so that a layer of metal powder covers the previously-formed layer of the article, and another layer of the powder is fused and solidified by selective exposure to the energy source based on data from another corresponding layer of the computer model. The resulting can be relatively complex, compared to structures obtainable by conventional metal fabrication techniques such as casting, forging, and mechanical deformation.

Attempts to fabricate metal articles using additive manufacturing techniques have met with limited success. Many alloys such as aluminum alloys used for casting have been proposed or tried for powder casting or additive manufacturing. However, many such alloys have limitations on strength or other physical properties that renders them unsuitable for many applications, including but not limited to aerospace and other applications requiring strength. For example, the alloy Al12Si has been used for additive manufacturing for its weldability, but has limitations such as physical properties and processability.

BRIEF DESCRIPTION

According to some embodiments of this disclosure, a method for making an article comprises inputting a digital model of an article into an additive manufacturing apparatus comprising an energy source. The additive manufacturing apparatus applies energy from the energy source to successively applied incremental quantities of a powder to fuse the powder to form the article corresponding to the digital model. As described herein, the powder particles individually comprise a composite core comprising a first phase comprising a first metal and a second phase comprising a ceramic. A first shell over the core comprises a second metal.

According to some embodiments, a method for making a metal-ceramic composite powder comprises fabricating a porous pre-form comprising a ceramic, and infiltrating the porous ceramic pre-form with a liquid comprising a first metal. The liquid is solidified to form a solid composite structure comprising ceramic and metal. The solid composite structure is mechanically broken down to form composite powder particles comprising the first metal and the ceramic.

According to some embodiments, a metal ceramic composite powder comprises particles that individually comprise a composite core comprising a first phase comprising a first metal and a second phase comprising a ceramic. A first shell over the core comprises a second metal.

BRIEF DESCRIPTION OF THE DRAWINGS

The subject matter which is regarded as the disclosure is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Figure 1:
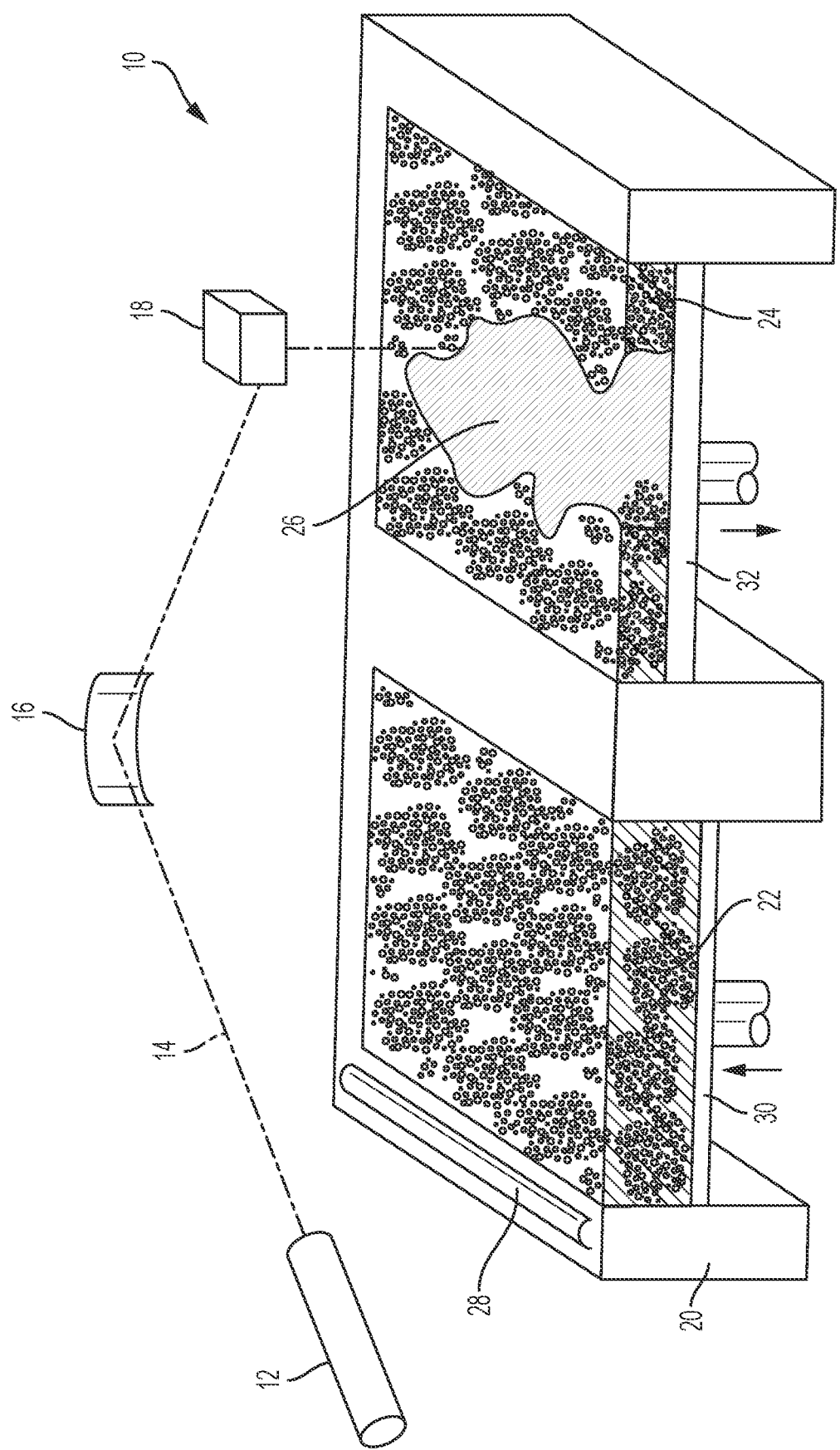
FIG. 1 is a schematic depiction of an apparatus for making an article according to the methods described herein.

Referring now to FIG. 1, an example of an additive manufacturing system or apparatus 10 includes energy source 12 that generates an energy beam 14, a first mirror or other optical guide 16, a second mirror or optical guide 18, a frame 20, a powder supply 22, a powder processing bed 24, sintered powder material 26, a spreader 28, a powder supply support 30, and a stack support 32. Of course, the illustration in FIG. 1 is schematic in nature, and many alternative designs of additive manufacturing devices are possible. Various types of additive manufacturing materials, energy sources, and processes can be used to fabricate the air temperature sensor housing and the individual features thereof that are described herein. The type of additive manufacturing process used depends in part on the type of material out of which it is desired to manufacture the sensor housing. In some embodiments, the sensor housing is made of metal, and a metal-forming additive manufacturing process can be used. Such processes can include selective laser sintering (SLS) or direct metal laser sintering (DMLS), in which a layer of metal or metal alloy powder is applied to the workpiece being fabricated and selectively sintered according to the digital model with heat energy from a directed laser beam. Another type of metal-forming process includes selective laser melting (SLM) or electron beam melting (EBM), in which heat energy provided by a directed laser or electron beam is used to selectively melt (instead of sinter) the metal powder so that it fuses as it cools and solidifies. FIG. 1 merely illustrates one potential additive manufacturing system for creating an additively manufactured article.

Energy source 12 can be any source capable of creating focused energy. For example, energy source 12 can be a laser or an electron beam generator. Energy source 12 generates an energy beam 14, which is a beam of focused or focusable energy, such as a laser beam or an electron beam. Optical guide 16 such as a mirror is present in some embodiments to deflect radiation in a desired direction. A second optical guide 18, such as an optical head is present in some embodiments, and also directs energy in a desired direction. For example, optical guide 18 can include a mirror and be attached to an x-y positioning device. Frame 20 is used to contain powder material in powder supply 22 and in powder processing bed 24. Powder supply 22 and powder processing bed 24 include powder material, such as or powdered metals. Powder processing bed 24 further includes fused powder 26. Fused powder 26 is powder contained within powder processing bed 24 that has been at least partially sintered or melted. Spreader 28 is a spreading device such as an air knife using an inert gas instead of air, which can transfer powder material from powder supply 22 to powder processing bed 24. Powder supply support 30 and stack support 32 are used to raise and/or lower material thereon during additive manufacturing.

During operation, energy source 12 generates energy beam 14, which is directed by the optical guides 16 and 18 to the powder processing bed 24. The energy intensity and scanning rate and pattern of the energy beam 14 can be controlled to produce a desired result in the powder processing bed. In some aspects, the result can be partial melting of powder particles resulting in a fused structure after solidification such as a sintered powder metal structure having some degree of porosity derived from the gap spaces between fused powder particles. In some aspects, the result from exposure to the energy beam 14 can be complete localized melting and fluidization of the powder particles producing a metal article having a density approaching or equal to that of a cast metal article. In some aspects, the energy beam provides homogeneous melting such that an examination of the manufactured articles can detect no particle pattern from the original particles. After each layer of the additively manufactured article is completed, powder supply support 30 is moved to raise the height of powder material supply 22 with respect to frame. Similarly, stack support 32 is moved to lower the height of article with respect to frame 20. Spreader 28 transfers a layer of powder from powder supply 22 to powder processing bed 24. By repeating the process several times, an object may be constructed layer by layer. Components manufactured in this manner may be made as a single, solid component, and are generally stronger if they contain a smaller percentage of oxygen, hydrogen, or carbonaceous gases. Embodiments of the present invention reduce the quantity of impurities of, for example, oxygen, to less than 50 ppm, or even less than 20 ppm.

The digital models used in the practice of the disclosure are well-known in the art, and do not require further detailed description here. The digital model can be generated from various types of computer aided design (CAD) software, and various formats are known, including but not limited to SLT (standard tessellation language) files, AMF (additive manufacturing format) files, PLY files, wavefront (.obj) files, and others that can be open source or proprietary file formats.

Figure 2:
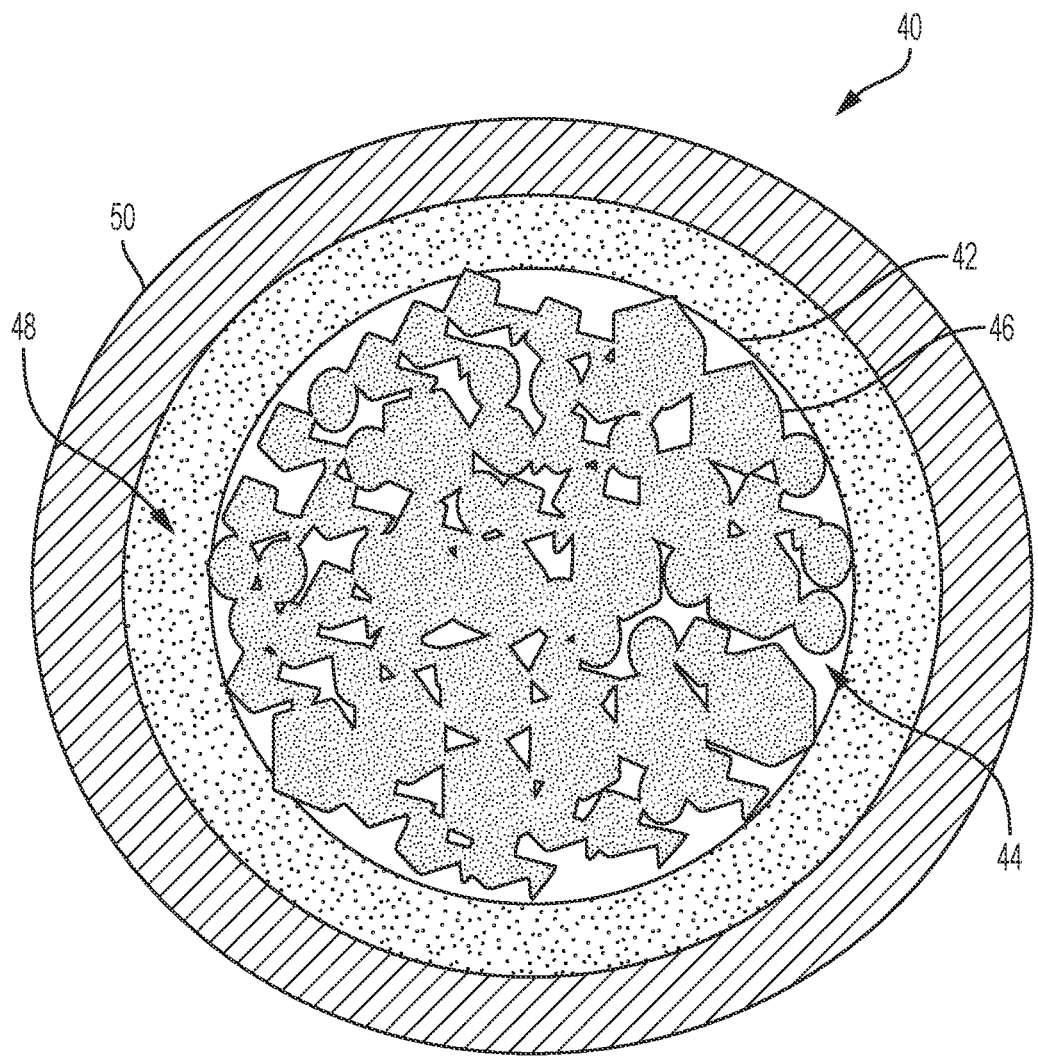
FIG. 2 is a schematic depiction of metal-ceramic composite powder particle.

As mentioned above, the powder described herein comprises a composite core comprising a first phase comprising a first phase comprising a first metal and a second phase comprising a ceramic. An example embodiment of a powder particle is schematically depicted in FIG. 2. As shown in FIG. 2, an example particle 40 comprises a central core 42. The core 42 is a composite structure comprising a first phase 44 comprising a first metal, and a second phase 46 comprising a ceramic. In some embodiments, the metal-containing first phase 44 can be a continuous phase that can in some embodiments be a matrix, and the ceramic-containing second phase 46 can be a continuous phase, a discrete phase (e.g., dispersed in the continuous phase 44), or can have portions that are continuous and portions that are discrete. It should be noted that portions of the first phase 44 can also include discontinuous portions as well. The core 42 can be formed in various ways. In some embodiments, a liquid (e.g., melted) metal composition can be infiltrated into a porous ceramic pre-form and solidified composite material comprising metal and ceramic, followed by mechanical breakdown of the solidified composite into powder particles. Other methods could be used as well. For example, ceramic particles can be dispersed into a liquid metal composition and solidified into larger particles, for example in a fluidized bed.

In some embodiments, a ceramic pre-form can be prepared by introducing particles comprising ceramic to a mold cavity and applying heat and pressure. In some embodiments, a polymer binder can also be introduced into the mold cavity and then later pyrolyzed during sintering or other heating of the composite material to promote porosity. In some embodiments, the ceramic particle can be sintered. The degree of sintering can be controlled by temperature, pressure, and duration to achieve a target porosity. In some embodiments, the pre-form has a porosity in a range having a low end of 10 vol. %, more specifically 15 vol. %, and even more specifically 20 vol. %, and an upper end of 90 vol. %, more specifically 80 vol. %, and even more specifically 70 vol. %. The above upper and lower endpoints can be independently combined to disclose a number of different ranges. The specific sintering pressures and temperatures will also vary depending on the characteristics of the ceramic. In a non-limiting example of a silicon carbide ceramic, sintering pressure can range from 0 psi to 200 psi, and sintering temperature can range from 2000° C. to 2500° C. The above upper and lower endpoints can be independently combined to disclose a number of different ranges. As is readily seen in FIG. 2, the particle size of the ceramic-containing second phase 46 is necessarily smaller than the size of the composite core 42. Accordingly, ceramic particle sizes can vary widely depending on the size specifications for the particle 40. In additive manufacturing embodiments, for example, particle sizes for use in powder bed fusion manufacturing can in some embodiments range from 10 μm to 100 μm. For such a particle size range, ceramic particles in the core can have particle sizes in a range having a low end of 5 μm, more specifically 10 μm, and even more specifically 15 μm, and an upper end of 40 μm, more specifically 35 μm, and even more specifically 30 μm. The above upper and lower endpoints can be independently combined to disclose a number of different ranges.

A ceramic pre-form can be infiltrated with liquid (e.g., melted) metal using various techniques. In some embodiments, a pre-form structure (e.g., a plate structure having a thickness of 0.075 inches to 0.150 inches), can be immersed in a molten metal that has been super-heated above its melting point to reduce its viscosity to promote infiltration by capillary action through the pre-form. Other infiltration techniques can include pour and evacuate, in which liquid metal is poured into a fill chamber holding the pre-form and a piston withdraws air from the fill chamber as it is displaced by liquid metal infiltrating into the pre-form. Other techniques include suction transfer where a piston associated with a fill chamber provides a partial vacuum to draw liquid metal into a pre-form, or pressure transfer where a pressure differential drives higher pressure liquid metal into the spaces in the pre-form. The liquid metal that has infiltrated into the ceramic pre-form is cooled to solidify it, resulting in a metal-ceramic composite structure. This composite structure can then be mechanically broken down, e.g., by fracture, cutting, grinding, milling processes, to a target particle size. Core particle sizes can vary widely, e.g., from 10 μm to 125 generally, to 10 μm to 100 μm for powder fusion additive manufacturing.

Various metals can be used in the core, including but not limited to aluminum and aluminum alloys (as used herein, the term "alloy" of a metal includes solid solutions comprising the metal), iron and steel alloys, nickel-based alloys, or copper alloys. In some embodiments, the first metal can be aluminum (e.g., pure aluminum) or an aluminum alloy. Aluminum alloys and techniques for preparing them are well-known in the art as described, for example, in Aluminum and Aluminum Alloys, ASM Specialty Handbook, J. R. Davis, ASM International, the disclosure of which is incorporated herein by reference in its entirety. Alloys can be formed by melting the base alloy elements in a crucible curing with rapid solidification, followed by processing operations such as cutting and grinding. Examples of ceramics that can be used in the core include, but are not limited to, silicon carbide, aluminum nitride, silicon nitride, or aluminum oxide.

The particle cores 42 as described above can have utility themselves, e.g., as a filler in a metal or ceramic matrix material, or they can be subjected to further manufacturing processing for use in additive manufacturing powder fusion processes. As further shown in FIG. 2, the particle core 42 has a first shell 48 comprising a second metal over the core. The second metal can be selected from any of the metals listed above for the first metal, and can be the same as or different than the second metal. A technical effect of the composite particles is that the composition of the first shell 48 can be chosen to provide weldability to promote the fusion process while the metal in the core can be chosen to provide other properties such as physical properties or heat process capabilities that may be lacking in the available metal alloys that provide good weldability. The trade-off between weldability and physical and other properties is observed for many metal families including but not limited to aluminum. Accordingly, in some embodiments, the first metal comprises aluminum (including both pure aluminum and aluminum alloys), and the first shell comprises aluminum and also includes silicon to help promote weldability. In some embodiments, the shell comprises aluminum, and also comprises silicon at a concentration in a range having a low end of 0.5 wt. %, more specifically 0.75 wt. %, and even more specifically 1 wt. %, and an upper end of 13 wt. %, more specifically 12.5 wt %, and even more specifically 12 wt. %, based on the total amount of aluminum and silicon in the first shell. Examples of silicon-containing aluminum alloys include but are not limited to Al12Si, AlSi10Mg, C356.0 (Aluminum Association Inc. naming protocol), F357 (Aluminum Association Inc. naming protocol). The metal shell can be applied to the particles by techniques including but not limited to ball milling, vapor deposition, or fluidized bed. The thickness or mass of the shell can vary depending on the particle size and target properties of a powder fusion manufactured article. In some embodiments, the first shell can have enough material to flow and form a metal matrix around the composite core. During powder fusion additive manufacturing, in some embodiments, the first shell will partially or completely melt. In some embodiments, the first metal in the core can partially melt.

In some embodiments, the particles can comprise a second shell 50 over the first shell 48. In some embodiments, the second shell can have a lower reflectivity at the applied energy wavelength than the first shell. This can help promote absorption of energy by the particles during the powder fusion process. In some embodiments, a second shell of lower reflectivity is used in combination with underlying aluminum alloys (e.g., in the first shell) that have higher reflectivity. Examples of materials for the second shell include silicon, zirconium, rare earth elements (e.g. samarium, neodymium, praseodymium, etc). In some embodiments, the second shell comprises at least 50 wt. %, more specifically at least 75 wt. %, and even more specifically at least 95 wt. % silicon or other material having lower reflectivity than the first shell. The thickness of the second shell 50 can range from 0.5 μm to 5 μm, and it can be applied using the same techniques as described above for the first shell 48 or by other techniques such as fluidized bed.

As mentioned above, particle sizes for the powder fusion can range from 10 μm to 100 μm. In some aspects, the alloy elements can be combined together before forming a powder having a homogeneous composition. In some aspects, such as where particles will fully melt, one or more of the individual alloy elements can have its own powder particles that are mixed with particles of other elements in the alloy mixture, with formation of the actual alloy to occur during the fusion step of the additive manufacturing process. In some aspects, the powder is "neat", i.e., it includes only particles of the alloy or alloy elements. In other aspects, the powder can include other components such as polymer powder particles. In selective sintering, polymer particles can help to temporarily bind metal powder particles together during processing, to be later removed by pyrolysis caused by the energy source or post-fabrication thermal processing.

Many of the above embodiments can be used in combination. For example, according to some embodiments, a method for making an article comprises fabricating a porous pre-form comprising a ceramic, and infiltrating the porous ceramic pre-form with a liquid comprising a first metal. The liquid is solidified to form a solid composite structure comprising ceramic and metal. The solid composite structure is mechanically broken down to form composite powder particles comprising the first metal and the ceramic, and a shell comprising a second metal is formed on the powder particles. A digital model of the article is inputted to an additive manufacturing apparatus or system comprising an energy source. The additive manufacturing apparatus applies energy from the energy source to successively applied incremental quantities of the powder to fuse the powder to form the article corresponding to the digital model.

According to some embodiments, a method for making an article fabricating a porous pre-form comprising a ceramic, and infiltrating the porous ceramic pre-form with a liquid comprising aluminum. The liquid is solidified to form a solid composite structure comprising ceramic and aluminum. The solid composite structure is mechanically broken down to form composite powder particles comprising aluminum and the ceramic, and a first shell comprising aluminum and from 0.5 to 13 wt. % silicon is formed on the powder particles. A second shell comprising at least 3 wt. % silicon is formed over the first shell. A digital model of the article is inputted to an additive manufacturing apparatus or system comprising an energy source. The additive manufacturing apparatus applies energy from the energy source to successively applied incremental quantities of the powder to fuse the powder to form the article corresponding to the digital model.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method for making a metal-ceramic composite powder, comprising:
   fabricating a porous pre-form comprising a ceramic;
   infiltrating the porous ceramic pre-form with a liquid comprising a first metal;
   solidifying the liquid to form a solid composite structure comprising ceramic and metal;
   mechanically breaking down the solid composite structure to form composite powder particles comprising the first metal and the ceramic; and
   forming a first shell comprising a second metal on the powder particles,
   wherein the second metal comprises aluminum.

2. The method of claim 1, wherein fabricating the porous pre-form comprises sintering particles comprising a ceramic under temperature and pressure conditions to achieve a target porosity.

3. The method of claim 1, wherein the second metal of the first shell further comprises silicon alloyed or in solid solution with the aluminum.

4. The method of claim 1, wherein the first shell comprises from 0.5 to 13 wt. % silicon.

5. The method of claim 1, further comprising forming a second shell over the first shell, the second shell having a reflectivity less than that of the first shell.

6. The method of claim 5, wherein the second shell comprises silicon, zirconium, or a rare earth element.

7. The method of claim 1, further comprising forming a second shell comprising 50-100 wt. % silicon over the first shell.

8. A method for making a metal-ceramic composite powder, comprising:
   fabricating a porous pre-form comprising a ceramic;
   infiltrating the porous ceramic pre-form with a liquid comprising a first metal;
   solidifying the liquid to form a solid composite structure comprising ceramic and metal;
   mechanically breaking down the solid composite structure to form composite powder particles comprising the first metal and the ceramic, and
   forming a first shell comprising a second metal on the powder particles,
   wherein the first shell comprises between 0.5 to 13 wt. % silicon.

9. The method of claim 8, wherein fabricating the porous pre-form comprises sintering particles comprising a ceramic under temperature and pressure conditions to achieve a target porosity.

10. The method of claim 8, wherein the second metal comprises aluminum.

11. The method of claim 8, further comprising forming a second shell over the first shell, the second shell having a reflectivity less than that of the first shell.

12. The method of claim 8, further comprising forming a second shell comprising 50-100 wt. % silicon over the first shell.

13. A method for making a metal-ceramic composite powder, comprising:
   fabricating a porous pre-form comprising a ceramic;
   infiltrating the porous ceramic pre-form with a liquid comprising a first metal;
   solidifying the liquid to form a solid composite structure comprising ceramic and metal;
   mechanically breaking down the solid composite structure to form composite powder particles comprising the first metal and the ceramic, and
   forming a first shell comprising a second metal on the powder particles,
   forming a second shell over the first shell, the second shell having a reflectivity less than that of the first shell.

14. The method of claim 13, wherein the second shell comprises silicon, zirconium, or a rare earth element.

15. The method of claim 13, wherein fabricating the porous pre-form comprises sintering particles comprising a ceramic under temperature and pressure conditions to achieve a target porosity.

16. A method for making a metal-ceramic composite powder, comprising:
   fabricating a porous pre-form comprising a ceramic;
   infiltrating the porous ceramic pre-form with a liquid comprising a first metal;
   solidifying the liquid to form a solid composite structure comprising ceramic and metal;
   mechanically breaking down the solid composite structure to form composite powder particles comprising the first metal and the ceramic;
   forming a first shell comprising a second metal on the powder particles; and
   forming a second shell comprising 50-100 wt. % silicon over the first shell.

17. The method of claim 16, wherein fabricating the porous pre-form comprises sintering particles comprising a ceramic under temperature and pressure conditions to achieve a target porosity.

\* \* \* \* \*